United States Patent [19]

Soboroff et al.

[11] 4,337,129

[45] Jun. 29, 1982

[54] REGENERATION OF WASTE METALLURGICAL PROCESS LIQUOR

[75] Inventors: David M. Soboroff; Jerry D. Troyer; Andrew A. Cochran, all of Rolla, Mo.

[73] Assignee: The United States of America as represented by the Secretary of the Interior, Washington, D.C.

[21] Appl. No.: 200,111

[22] Filed: Oct. 24, 1980

Related U.S. Application Data

[63] Continuation-in-part of Ser. No. 37,089, May 8, 1979, abandoned.

[51] Int. Cl.$^3$ .............................................. C02F 1/46
[52] U.S. Cl. ................................... 204/151; 204/152; 204/180 P
[58] Field of Search ............... 204/149, 152, 130, 97, 204/180 P, 151, 282

[56] References Cited

U.S. PATENT DOCUMENTS

| | | | |
|---|---|---|---|
| 3,481,851 | 12/1969 | Lancy | 204/180 P |
| 3,682,796 | 8/1972 | Dev Bedi et al. | 204/97 |
| 3,764,503 | 10/1973 | Lancy et al. | 204/180 P |
| 3,909,381 | 9/1975 | Ehrsam | 204/130 X |
| 4,069,128 | 1/1978 | Westerlund | 204/282 X |
| 4,111,772 | 9/1978 | Horn | 204/180 P |
| 4,118,295 | 10/1978 | Korenowski et al. | 204/151 |
| 4,201,653 | 5/1980 | O'Neill et al. | 204/282 X |

*Primary Examiner*—T. M. Tufariello
*Attorney, Agent, or Firm*—William S. Brown; Donald A. Gardiner

[57] ABSTRACT

Spent aqueous hexavalent chromium solutions containing trivalent chromium ions and extraneous metal ions are oxidized by placing said exhausted $Cr^{+6}$ solution in the anode compartment of an electrolytic cell as the anolyte, said cell being separated into anode and cathode compartments by at least one cation selective membrane, said cathode compartment containing a catholyte, and impressing a direct current across the anode and cathode of said cell of a difference in potential sufficient to promote the oxidation of trivalent chromium in the solution in said anode compartment to hexavalent chromium while extraneous metal ions in the anolyte solution migrate through said membrane into the catholyte of said cathode compartment where copper ions are plated onto said cathode. The anode compartment consists of a removable and portable container consisting essentially of a framework having side members secured thereto, at least one of said anode members comprising a cation selective membrane.

7 Claims, 3 Drawing Figures

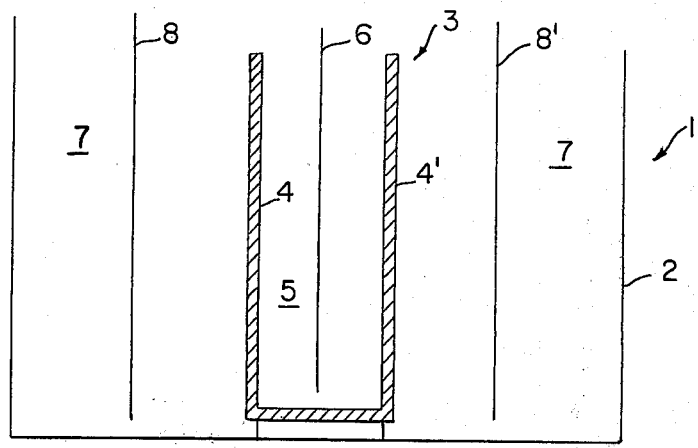
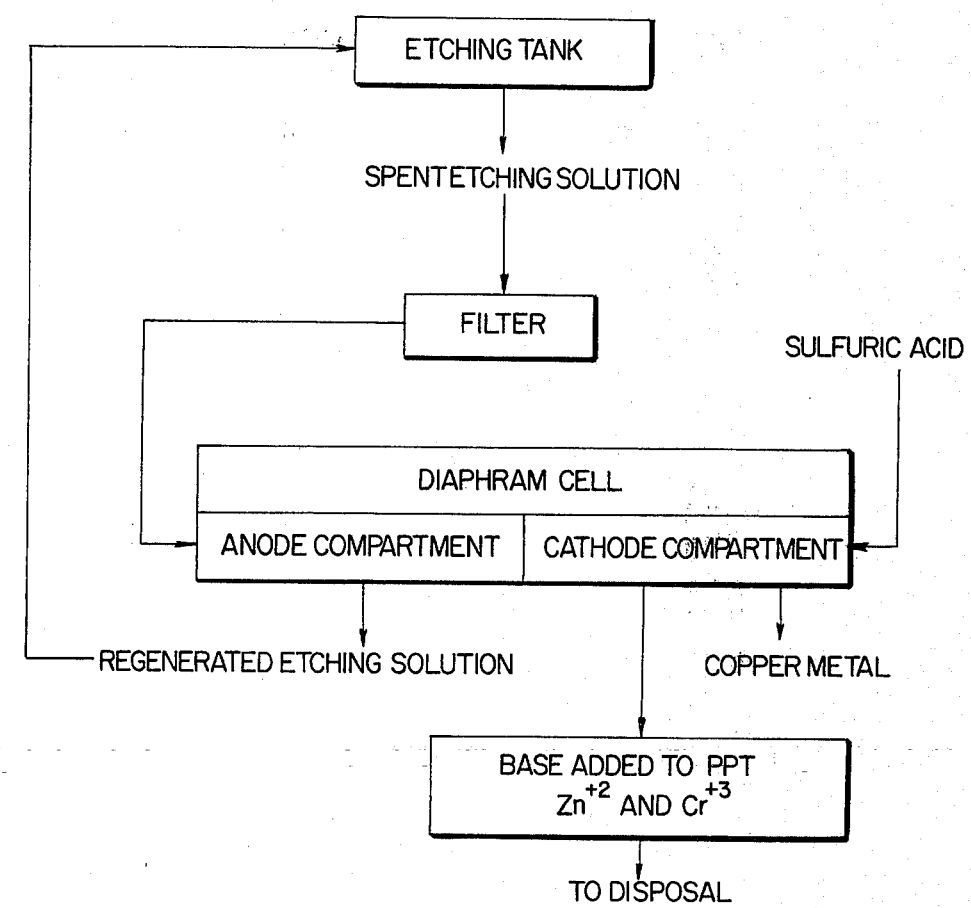

REGENERATION OF WASTE METALLURGICAL PROCESS LIQUOR

This application is a continuation-in-part of application Ser. No. 37,089, filed May 8, 1979, now abandoned.

BACKGROUND OF THE INVENTION

1. Field of the Invention

The present invention relates to a method of regenerating spent etching or oxidizing media based upon hexavalent chromium as the oxidizing agent. More particularly, the present invention relates to an electrolytic technique for regenerating hexavalent chromium oxidizing solutions while substantially reducing the quantities of impurity metal ions in solution.

2. Description of the Prior Art

Oxidizing solutions based upon hexavalent chromium in aqueous sulfuric acid have been employed in cleaning and etching operations in the treatment of plastics for plating, in brass finishing, in printed circuit board etching, in anodizing and in other surface treatments. As the oxidizing solutions are used, $Cr^{+6}$ is reduced to $Cr^{+3}$ and the dissolved solids content increases while the effective acid concentration diminishes. However, after use of such cleaning solutions, the problem which remains is disposal of the spent etching solutions, i.e., solutions whose etching rate is less than that required for a given operation.

In the past, substantial quantities of chromium values have been lost through discard of the solutions. Moreover, the technology for the ultimate disposal of chromium wastes usually requires the reduction of remaining $Cr^{+6}$ to $Cr^{+3}$. The solution containing trivalent chromium is then treated with a base to precipitate chromium values and other extraneous metals present as the hydroxides. The solid sludge obtained has been used as a landfill material which represents a substantial waste of valuable chromium values.

The use of chromic acid-sulfuric acid etchants in the fashion described above poses significant problems for the recovery of secondary resources and for pollution control. It is significant that the entire U.S. production of primary chromium is achieved from imported ores. In fact, more than 30,000 tons of chromium are employed annually for the oxidizing treatment of various surfaces and for corrosion control measures. Because of minimal recovery technology and because of the practices of the finishing industry which utilize $Cr^{+6}$ oxidizing solutions, substantial quantities of valuable secondary chromium materials are lost. Furthermore, waste chromium has long been recognized as a major pollution problem. In fact, the prevailing EPA regulations prevent the discharge of waste water containing more than 0.25 ppm $Cr^{+6}$ into sewers by plants discharging more than 10,000 gal/day of aqueous chromium wastes. Still further, suitable landfill areas for chromium hydroxide sludge materials are becoming increasingly scarce, and the collection, treatment and disposal of chromium wastes by contractors is expensive.

Because of the problem involved in the disposal of waste chromium values, it would be desirable to have a method by which spent chromic acid-sulfuric acid etching solutions could be regenerated and recycled for reuse within a plant. The recycle of such regenerated etching solutions would be very helpful in reducing the volume of chromium-containing effluents, thus reducing the costs of waste treatment and disposal, and in addition, conserving chromium resources.

The constraints upon a viable in-plant regenerating and recycling process for these etchants are more severe than those applicable for simple metal recovery processes. These constraints include the fact that reagent additions are limited since reagent removal would then be necessary. Any increase in the volumes of Cr solutions or decrease in concentration of Cr in solutions would necessitate some type of evaporative recovery process.

Etchants used to prepare plastic for plating present a different problem. The high $Cr^{+6}$ concentration used results in a very corrosive solution. Since many plastic etching operations now use countercurrent rinsing coupled with evaporative recovery to recover chromium values lost in the rinse, it would be desirable to oxidize $Cr^{+3}$ and remove contaminant metals from the rinse. The rinse could then be concentrated and returned to the etching tank. This procedure would minimize contamination of the etchant.

Several techniques have been proposed for the regeneration of waste chromium containing solutions. In the method disclosed by Lancy et al., U.S. Pat. No. 3,764,503, a solution containing hexavalent chromium values and other metal ions is introduced into one dialysis compartment of an at least two-compartment electrolytic dialysis unit. The solution to be regenerated is introduced into the anode compartment where oxidation of metal ions occurs. The metal ions then diffuse through a cation permeable membrane into another region of the dialysis unit. This second region of the unit either contains the cathode or is separated from the cathode compartment by an anion permeable membrane. If the second region contains the cathode, the cathode is of a metal ion pick-up inhibiting or restricting type, while if the cathode is in a region adjacent the second region, cation permeation into the cathode chamber is prevented by the anion permeable membrane. The patent, contrary to the principal objective of the present invention, does not show an electrolytic technique of reoxidizing $Cr^{+3}$ values in a spent $Cr^{+6}$-acid solution. In fact, it only shows $H_2CrO_4$-acid solutions containing such extraneous metals as copper. Moreover, unlike the process of the present invention, the $Cu^{+2}$ ions generated are prevented from building up in the catholyte. Dendritic growth also occurs in the catholyte of the patent.

Tirrell, U.S. Pat. No. 3,761,369, shows a technique of reclaiming spent etching fluids containing chromium values. However, the technique disclosed is one which is performed in two stages, in which in the first stage remaining $Cr^{+6}$ ions in solution are reduced to $Cr^{+3}$ ions. Following the reduction of $Cr^{+6}$ ions to $Cr^{+3}$ ions, copper metal is plated from the solution onto the cathode, with the termination of copper plating indicated by the electrolytic generation of hydrogen. After completion of metal reduction, the solution containing $Cr^{+3}$ values is transferred to the anode chamber where $Cr^{+3}$ ions are reoxidized to $Cr^{+6}$ ions. Thus, the system of Tirrell is less efficient than the present process because Cr values are first reduced and then reoxidized. Fujii, U.S. Pat. No. 3,948,738, shows a two stage electrolytic diaphragm process for the regeneration of exhausted chromium-plating solutions which is the same as the process of Tirrell in that it at least involves initial cathodic reduction of hexavalent chromium to trivalent chromium and then transfer of the cathodic solution to the anode of the electrolyte cell where $Cr^{+3}$ is reoxidized to $Cr^{+6}$. Accordingly, the Fujii process is as inefficient as the Tirrell process with respect to the present process for the reasons mentioned above.

Lancy, U.S. Pat. No. 3,481,851, discloses the use of electrodialysis for removal of metallic contaminants, such as copper and iron, from spent aqueous chromium plating solutions. The chromium solution is contained in the anolyte compartment of the electrodialysis cell, with an aqueous mineral acid solution in the catholyte compartment and with the two compartments being separated by a cationic permeable membrane. Electrolysis causes the contaminant cations to migrate from the anolyte compartment to the catholyte compartment, while simultaneously oxidizing a portion of the trivalent chromium present in the spent solution to the hexavalent state. It has been found, however, that the efficiency of oxidation of trivalent to hexavalent chromium in the process of Lancy is relatively low, particularly as applied to spent chromium etching solutions. Therefore, a need continues to exist for a method by which exhausted $Cr^{+6}$ etching or oxidizing solutions can be efficiently regenerated to reusable and functioning etching solutions.

SUMMARY OF THE INVENTION

Accordingly, one object of the present invention is to provide an electrolytic technique of efficiently regenerating exhausted hexavalent chromium etching solutions.

Another object of the present invention is to provide a technique of regenerating spent hexavalent chromium etchant solutions containing extraneous metal impurities such as copper and zinc by reoxidizing $Cr^{+3}$ values in solution to $Cr^{+6}$ values and simultaneously removing substantial portions of said extraneous metal ions.

Still another object of the invention is to provide a technique of regenerating aqueous rinse solutions obtained from plastic etching operations. These rinses contain copper and nickel impurities in addition to $Cr^{+3}$ ions.

Briefly, these objects and other objects of the present invention, as will hereinafter become more readily apparent, can be obtained by a method of regenerating exhausted hexavalent chromium oxidizing solutions comprising placing said exhausted $Cr^{+6}$ solution in a specific type of anode compartment in an electrolytic cell, as the anolyte, said cell being thereby separated into anodic and cathodic compartments by at least one cation selective membrane, said cathode compartment containing a catholyte, and impressing a direct current across the anode and cathode of said cell of a difference in potential sufficient to promote the oxidation of trivalent chromium in the solution in said anode compartment to hexavalent chromium while extraneous metal ions in the anolyte solution migrate through said membrane into the catholyte of said cathode compartment where copper ions are plated onto said cathode. The specific type of anode compartment that is employed in the method of the invention, and which constitutes the essence of the invention, comprises a removable container formed by a framework having side members secured thereto, at least one of the side members comprising a cation selective membrane. This anode compartment is located within, but is unattached to, the cathode compartment.

It has been found that the use of the specific type of anode compartment employed in the invention results in a more efficient oxidation of chromium, i.e., a higher percentage of the trivalent chromium is oxidized to the hexavalent state. The reason for this increased efficiency is not known with certainty; however, it is believed to result from decreased leakage of anolyte solution into catholyte solution, or loss of the anolyte, as compared to that occurring in prior art processes. In addition, the anode compartment of the invention has the advantage of being portable, and hence easily transferred to a different electrolytic cell.

BRIEF DESCRIPTION OF THE DRAWINGS

Various other objects, features, and attendant advantages of the present invention will be more fully appreciated as the same becomes better understood from the following detailed description when considered in connection with the accompanying drawings in which:

FIG. 1 is a diagrammatic representation of an embodiment of the electrolytic cell employed in the process of the invention;

FIG. 3 is a flow diagram of a scheme for the continuous electrolytic oxidation of $Cr^{+3}$ solutions also containing copper and zinc.

DETAILED DESCRIPTION OF THE PREFERRED EMBODIMENTS

Figure 2:
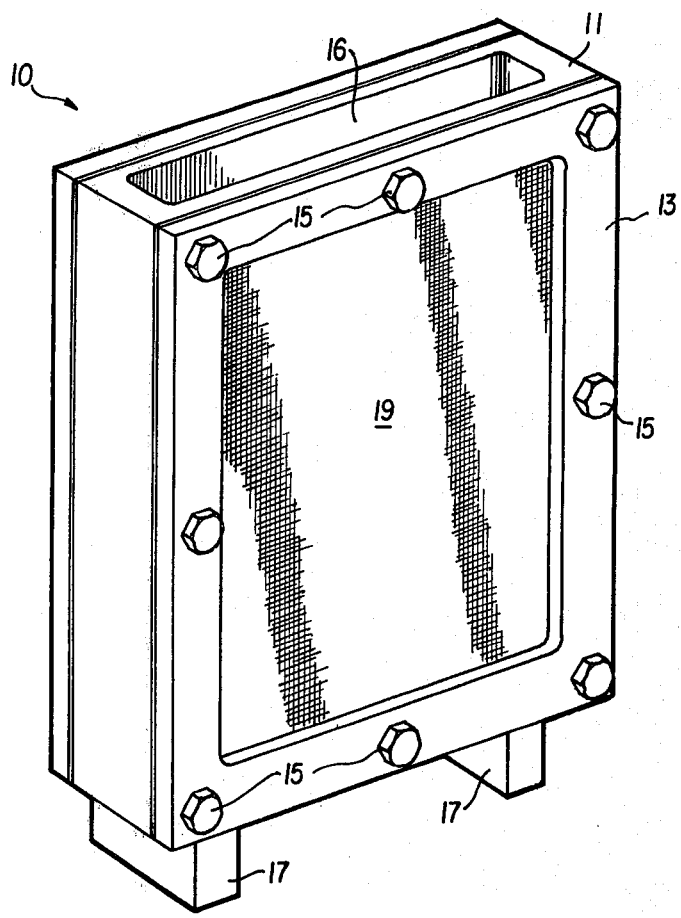
FIG. 2 is a frontal view of an anode compartment, one or more of which can be inserted into a container to form a cell such as shown in FIG. 1.

The present invention provides an energy efficient means of regenerating $Cr^{+6}$ ions in solutions containing trivalent chromium ions in addition to other extraneous metal ions. More particularly, the process of the present invention is effective for regenerating exhausted sulfuric acid based hexavalent chromium etchant solutions which contain reduced chromium ions, i.e., $Cr^{+3}$, and other metal ions. Aqueous sulfuric acid $Cr^{+6}$ oxidizing solutions which have been used to etch printed circuit boards, to finish brass, to treat plastics, to anodize and the like, and which contain significant quantities of such metal ion impurities as zinc, copper, nickel, iron, manganese, magnesium, calcium, sodium, and the like, are especially amenable to the present treatment method. Generally, the etching solutions and rinse water solutions obtained therefrom contain hexavalent chromium in a concentration of 10–100 g/l and sulfuric acid in a concentration ranging from 100–300 g/l.

Solutions which are especially amenable to treatment by the present process are the rinse water solutions obtained from the etching of plastic materials which have high $Cr^{+6}$ and sulfuric acid concentrations. These rinse water solutions also contain such extraneous metal impurities as copper and nickel in addition to $Cr^{+3}$. An advantage of treating such rinse water solutions by the present technique is that very corrosion resistant materials need not be used in the regeneration system which is a requirement when more corrosive spent $Cr^{+6}$ oxidizing solutions are treated. After the $Cr^{+3}$ values are reoxidized to $Cr^{+6}$ values by the present technique while removing substantial quantities of extraneous metal ions, the treated rinse water solutions can be concentrated by known techniques such as evaporation, distillation, or the like. Thereafter, the treated, concentrated solution can be restored to the solution in the plastic etching tank. While the technique of the present invention is chiefly intended for the regeneration of spent $Cr^{+6}$ oxidizing solutions, it will work very well on acidic solutions which contain chiefly $Cr^{+6}$ and $Cr^{+3}$ ions with little or no impurity ions present.

The treatment technique of the present invention can be better understood by reference to FIG. 1 which shows an embodiment of the electrolytic cell employed in the invention. Cell 1, defined by container 2, and containing removable and portable anode compartment 3, is divided by cation selective membranes 4 and 4' into anode chamber 5 containing anode 6 surrounded by cathode chamber 7 containing cathodes 8 and 8'. Spent or exhausted chromium oxidizing solution or rinse water solution is placed in anode chamber 5 and the catholyte (aqueous sulfuric acid) is placed in cathode chamber 7. Normally, the pH of the catholyte and solution in the anode chamber or anolyte ranges from 0.5 to 2. However, pH is not a critical factor in the performance of the present invention. Thereafter, a direct current is impressed across the electrodes so that oxidation of trivalent chromium ions to hexavalent chromium ions occurs at the anode 6 while extraneous ions in the anolyte migrate through the membranes 4 and 4' into the catholyte in the cathode chamber 7. Copper ions in the catholyte are plated out of solution onto the cathodes. However, any zinc ions which are present do not plate onto the cathodes. By this means an anolyte is obtained in which as least most of the trivalent chromium is reoxidized to $Cr^{+6}$ while a substantial amount of the extraneous metal ions migrates to the catholyte. Although FIG. 1 illustrates the use of a single anode compartment, two or more such anode compartments may be used in the electrolytic cell. Furthermore, the anode compartment may comprise only a single cation permeable membrane, e.g., 4', with membrane 4 being replaced by an impermeable material. In addition, single or multiple electrodes may be employed in either the anode chamber or the cathode chamber.

Referring to the electrolytic cell, any type of cation permeable membrane material which allows cation migration but which does not permit anolyte and catholyte mixing can be employed in the construction of the cell. Suitable cation permeable materials include cross-linked sulfonated copolymers of vinyl compounds, perfluorosulfonic acid, perfluorocarboxylic acid, and the like. The thickness of the membrane, while not critical, generally ranges from 0.005 inch for perfluorocarboxylic acid membranes to 0.1 inch for vinyl compound membranes. The anode, at which trivalent chromium ions are oxidized, is formed from such materials as lead, lead-antimony alloys, $PbO_2$ coated titanium, and the like. On the other hand, suitable metals and other conductive materials for use as cathodes include copper, stainless steel, titanium, platinum-coated titanium, and the like. The cathode should be a material at which copper can plate from solution, such as copper itself. The ratio of surface area of cathode to anode preferably ranges from about 1:1 to 2:1, and in the embodiment of the cell shown in FIG. 1, the ratio of cathode area to anode area to membrane area is preferably about 1:1:1. The surface area determinations are based upon the surface area of one face of an electrode which faces a given surface of the opposing electrode. Thus, for instance, in FIG. 1, if the surface area of one side of the anode is 1 ft.$^2$, then the total anode area is 2 ft.$^2$. Similarly, the total cathode area is 2 ft.$^2$ and the total membrane area for each membrane is 2 ft.$^2$. After electrolysis, the pH of the regenerated solution obtained generally ranges between about 0.5 and 1. Container 2 may be made of any material that is resistant to the catholyte, e.g., polyethylene, polypropylene or polyvinyl chloride.

FIG. 2 represents an embodiment of an anode compartment, of the type employed in the method of the invention, which is portable and easily insertable into a container such as shown by container 2 in FIG. 1. Thus, by placing anode compartment 10 of FIG. 2 into a container, the cell of FIG. 1 can be fabricated by placing cathodes 8 and 8' in the container on either side of the cation permeable membranes of anode compartment 10 in FIG. 2, and placing an anode 6 in compartment 10. Referring to FIG. 2 in greater detail, compartment 10 is formed of framework 11 on the base of which is attached supporting base members 17. Frames 13 on each side of compartment 10 are attached to framework 11 by attachment devices 15. Cation permeable membranes 19 are sandwiched between framework 11 and frames 13. Gaskets made of, e.g., fluorinated rubbers such as Viton, may be used between either side, or both sides, of the membranes and the framework and/or frames to aid in sealing. Opening 16 is provided at the top of cell 10 for the addition of anolyte solution and the insertion of an appropriate anode. Framework 11 and frames 13 are preferably made of a material which is resistant to oxidizing $Cr^{+6}$ ions in the exhausted $Cr^{+6}$ oxidizing solution placed in the anode. Suitable materials are, e.g., plexiglass, polyvinyl chloride, polypropylene, and titanium metal.

The cell of the present invention can be operated on a batchwise or continuous basis. In the electrolytic reaction, substantially all of the trivalent chromium can be reoxidized to hexavalent chromium. Simultaneously, extraneous metal ions in solution migrate cross the cation permeable membrane where they collect in the catholyte. Complete migration of all extraneous metal ions does not occur, although a sufficient migration does occur such that the treated anolyte can be satisfactorily reused as an etchant. In order to conduct the electrolysis reaction, a direct current is impressed across the anode and cathode at a potential ranging from about 2 to 7 volts and a current density ranging from about 10 amp/ft.$^2$ (1.1 amp/dm$^2$) to 40 amp/ft.$^2$ (4.3 amp/dm$^2$). The density and potential of the current impressed across the electrodes should be sufficient to oxidize trivalent chromium to $Cr^{+6}$ and to promote the migration of extraneous metal ions to the catholyte.

Since the etchant solution placed in the anode chamber which becomes the anolyte is an aqueous sulfuric acid solution, the solution which is used as the catholyte is preferably a fresh sulfuric acid solution of an $H_2SO_4$ concentration ranging from about 120 g/l to 240 g/l. The spent etchant which becomes the anolyte normally has a sulfuric acid concentration ranging from about 100 g/l to 300 g/l. In order to facilitate the electrolysis process, it has been found helpful to filter the spent oxidizing solution before it is placed in the anode chamber. This procedure reduces the content of sludge materials in solution and thus facilitates the electrolysis process by reducing membrane fouling and lowering cell resistance. Any filter can be employed which effectively traps particles of a size above about 3 μm and which is not oxidized by $Cr^{+6}$ ions in the solution to be treated. Suitable filtration can be accomplished with a filter such as a 1 μm pore size polypropylene cartridge.

Having generally described the invention, a more complete understanding can be obtained by reference to certain specific examples, which are included for purposes of illustration only and are not intended to be limiting unless otherwise specified.

EXAMPLE 1

Referring to FIG. 1 above, the anode chamber of the electrolytic cell was filled with a spent $Cr^{+6}$ etchant solution designated by sample number in table 1 below. Catholyte of a concentration of 180 g/l sulfuric acid in water was placed in the cathode chamber. A lead-based anode and copper cathodes were used in each cell. The ratio of the surface area of cathode to anode to membrane was 1:1:1. In the process of electrolysis, a direct current of a density of 2.15 amp/dm$^2$ was employed. Prior to placement of spent etchant in the anode chamber, each etchant solution was filtered through a 1-$\mu$m pore size polypropylene cartridge.

TABLE 1

Composition of spent etchants

| Sample | Composition, g/l | | | | | | | Other elements present as spectrographic trace |
|---|---|---|---|---|---|---|---|---|
| | $Cr^{+3}$ | $Cr^{+6}$ | Cu | Zn | Na | Ni | SO$_4$ | |
| 1 | 45 | 42 | 36 | 22 | 35 | 1.2 | 270 | Al, Ca, Co, Fe, K, Mg, Mn |
| 2 | 17 | 36 | 30 | TR$^1$ | 22 | ND$^2$ | 220 | Ca, Mg, Sn |
| 3 | 22 | 0.21 | 34 | 1.7 | 10 | ND$^2$ | 270 | Ag, Ca, Fe, Mg, Mn, Mo |
| 4 | 31 | 5.3 | 45 | 19 | 15 | TR$^1$ | 290 | Ca, Co, Fe, Mg, Mn, Pb, Si, Sn, |
| 5 | 3.6 | 35 | 0.96 | TR$^1$ | TR$^1$ | 0.77 | 135 | Ca, Co, Fe, Mg, Mn, Pb, Si, Sn, Ti |
| 6 | 7.3 | 58 | 16 | TR$^1$ | TR$^1$ | TR$^1$ | 98 | Ca, Fe, Mg, Mn, Si |
| 7 | 25 | 45 | 49 | TR$^1$ | TR$^1$ | TR$^1$ | 130 | Al, Ca, Fe, Mg, Si |
| 8 | 18 | 51 | 32 | TR$^1$ | TR$^1$ | ND$^2$ | 140 | Ca, Fe, Mg, Si |
| 9 | 13 | 56 | 37 | TR$^1$ | TR$^1$ | ND$^2$ | 133 | Ag, Ca, Fe, Mg |

$^1$Trace.
$^2$Not detected.

In the table above, spent etchants (sample nos. 1 and 4) were obtained from the oxidation of brass, and were electrolyzed for 24 hours at 14 amps at about 3 volts. Sample 1 was a spent brass etchant. Sample 3 was obtained from a solution used to etch a variety of substances. Samples 2 and 6–9 were obtained from the etching of printed circuit boards, while sample 5 was obtained from a rinse tank following a plastic etching operation. The results of electrolytic treatment for a number of the samples employed are shown in Table 2 below. Sample 5 was electrolyzed for 6 hours at 14 amps at about 4 volts.

TABLE 2

Composition of regenerated etchants

| Sample Regenerated | Composition, g/l | | | Copper removed, pct | Zinc removed, pct | Chromium lost to catholyte, pct |
|---|---|---|---|---|---|---|
| | $Cr^{+6}$ | Cu | Zn | | | |
| 1 | 82 | 19 | 13 | 47 | 41 | 5.8 |
| 2 | 51 | 16 | NA$^1$ | 47 | NA$^1$ | 3.8 |
| 3 | 21 | 18 | NA$^1$ | 47 | NA$^1$ | 4.6 |
| 4 | 32 | 19 | 9 | 58 | 53 | 11.1 |
| 5$^2$ | 34 | 0.46 | NA$^1$ | 52 | — | 12.0 |

$^1$Not Analyzed.

The oxidation of $Cr^{+3}$ to $Cr^{+6}$ was accomplished in all of the above samples of spent etchant without difficulty. The initial 80 pct of the $Cr^{+3}$ in any of the spent etchants was oxidized at 90 pct efficiency. The oxidation is relatively independent of membrane type, concentration of sulfuric acid in the catholyte, and current density. The rate of $Cr^{+3}$ oxidation is much faster than the rate of zinc and/or copper ion transfer through the membrane. Table 2 shows the composition of etchants 1 through 5 after regeneration. These are the results of static tests in which 870 ml of etchant was treated in 24 hours. One hundred percent of the $Cr^{+3}$ was oxidized in all samples. In the treatment of samples 1, 2 and 3, ionics Type-61 cation selective membranes were used. These membranes consist of cross-linked sulfonated copolymers of vinyl compounds. Samples 4 and 5 were treated using Nafion membrane consisting of perfluorosulfonic acid. The higher chromium loss shown probably is the result of leaks around the membranes. Nafion is preferred as a membrane because of its high oxidation resistance.

The cathode efficiency in each cell ranged from 30 pct initially to 5 pct when one-half of the copper had been removed. Although cathode efficiency is low, the cost of oxidizing the $Cr^{+3}$ is estimated at only 6.6 kwhr/kg of sodium dichromate (expressing oxidized chromium in terms of equivalent amounts of sodium dichromate) regenerated because of good anode efficiency. The cost estimate is based on the cell voltage (about 3 v) and current (14 amp). Table 3 below shows the performance of the diaphragm cell at various etchant flow rates for sample 4. As the flow rate was increased, the percent of the chromium that was oxidized decreased only slightly. The cost of regeneration of hexavalent chromium decreases as the requirements for copper and zinc removal decrease, because of the shorter retention time required.

| Diaphragm cell performance at various flow rates | | | |
|---|---|---|---|
| Flow rate, ml/hr | $Cr^{+3}$ oxidized, pct | Copper removed, pct | Zinc removed, pct |
| 30 | 98 | 72 | 57 |
| 50 | 97 | 67 | 43 |
| 75 | 94 | 55 | 47 |
| 100 | 92 | 44 | 33 |
| 150 | 90 | 33 | 25 |
| 200 | 86 | 31 | 32 |

Samples of spent etchant regenerated at the Bureau of Mines were evaluated by two brass companies. Both reported that the solution etchant, when diluted to the proper operating level, etched brass as well as a fresh solution. In addition, the regenerated etchant was found to be superior to a fresh etchant in removing "red stain" from brass.

The samples evaluated were regenerated from spent etchant supplied by each company. A dilution of each regenerated etchant was necessary because of the method of operation of the brass company's etching tank. As the workpieces progressed through the tank, the etchant becomes spent in two ways: (1) By dragout and the addition of water to bring the solution level up to operating level, and (2) through the reduction of $Cr^{+6}$ to $Cr^{+3}$ by the chemical action of the etchant. (Dragout is the $Cr^{+6}$ etching solution which clings to an article which has been etched in a tank of solution and then moved to a rinse rack. Sample 5 was taken from accumulated rinse solutions. The concentration of $Cr^{+6}$ ions in sample 5 is relatively high because of the high $Cr^{+6}$ concentration in the etching solution of 300 g/l.) The operator must add sodium dichromate and sulfuric acid at intervals to compensate for dragout losses. As the tank is operated, the composition of the etchant changes and the specific gravity of the solution increases. When the etching operation can no longer be made satisfactory by further additions of fresh etchant materials, the tank is emptied.

Two modes of operation are possible using the present etchant regeneration technique:

1. The etchant may be used until completely spent and then regenerated. After regeneration, the solution can be diluted to the proper operating level. Chemical consumption and dragout can be made-up by additions of the concentrated etchant. 2. The regeneration unit may operate continuously in direct connection with the etching tank. Dragout would still have to be made-up by chemical additions; however, the chemical content of the solution would reach a constant value, and the specific gravity of the solution would be lowered. This would minimize dragout. FIG. 3 shows a flowsheet compatible with either mode of operation.

EXAMPLE 2

A process size research unit (cell) was designed wherein the cell had the dimensions of $0.91 \times 0.91 \times 0.91$ m, contained two anode compartments and required a direct current of about 500 amp at 3 volts. The only significant difference between the process unit and the cell shown in FIG. 1 besides size was the use of at least two anode compartments in the cell.

In a test the cell was continuously operated for 72 hours using a spent brass $Cr^{+6}$ oxidizing solution containing (in g/l): 23 $Cr^{+3}$, 8.2 $Cr^{+6}$, 28 $Cu^{+2}$, and 13 $Zn^{+2}$. Oxidation of $Cr^{+3}$ to $Cr^{+6}$ on the average was 98%, while copper and zinc on the order of 41% were removed from the anolyte. The energy consumed in the operation of the device was 8.6 kwhr/kg of sodium dichromate. Copper powder, containing 90% copper, was recovered from the cathodes. Upon processing of the copper by adding 2% carbon to the copper powder and melting the same in an induction furnace, a copper ingot was obtained containing 99.7% Cu.

Having now fully described the invention, it will be apparent to one of ordinary skill in the art that many changes and modifications can be made thereto without departing from the spirit or scope of the invention as set forth herein.

We claim:

1. A method of regenerating an exhausted aqueous hexavalent chromium solution containing trivalent chromium ions and extraneous metal ions including copper ions, comprising:

providing an electrolytic cell comprising a cathode compartment and at least one anode compartment, said cathode compartment having at least one cathode located therein, and said anode compartment consisting essentially of a removable container formed by a framework having a cation selective membrane secured to at least one side thereof, and said container being located within, but unattached to, the cathode compartment and having at least one anode located therein, placing said exhausted chromium solution, as anolyte, in the anode compartment of said cell, and placing aqueous sulfuric acid, as catholyte, in the cathode compartment of said cell, and impressing a direct current across the anode and cathode of said cell of a difference in potential sufficient to promote oxidation of trivalent chromium in the anolyte to hexavalent chromium, while the extraneous metal ions in the anolyte migrate through said membrane into the catholyte where copper ions are plated on the cathode.

2. The method of claim 1 in which said extraneous metal ions consist essentially of copper and zinc.

3. The method of claim 1 in which the anode compartment consists of a container formed by a framework having cation selective membranes secured to opposite sides thereof.

4. The method of claim 1 in which the exhausted hexavalent chromium solution is filtered to remove filterable contaminants therefrom.

5. The method of claim 1 in which said cathode consists essentially of copper.

6. The method of claim 1 in which said anode consists essentially of lead based alloy.

7. The method of claim 1 wherein the exhausted hexavalent chromium solution consists essentially of a spent etching solution.

* * * * *